455-612 AU 233 EX
FIP8106 XR 3,558,213

Jan. 26, 1971 E. A. J. MARCATILI 3,558,213

OPTICAL FREQUENCY FILTERS USING DISC CAVITY

Filed April 25, 1969 8 Sheets-Sheet 1

INVENTOR
E. A. J. MARCATILI
BY
Sylvan Sherman
ATTORNEY

OPTICAL FREQUENCY FILTERS USING DISC CAVITY

Filed April 25, 1969 8 Sheets-Sheet 3

Jan. 26, 1971 E. A. J. MARCATILI 3,558,213

OPTICAL FREQUENCY FILTERS USING DISC CAVITY

Filed April 25, 1969 8 Sheets-Sheet 4

Jan. 26, 1971 E. A. J. MARCATILI 3,558,213

OPTICAL FREQUENCY FILTERS USING DISC CAVITY

Filed April 25, 1969 8 Sheets-Sheet 8

United States Patent Office 3,558,213
Patented Jan. 26, 1971

3,558,213
OPTICAL FREQUENCY FILTERS USING DISC CAVITY

Enrique A. J. Marcatili, Rumson, N.J., assignor to Bell Telephone Laboratories, Incorporated, Murray Hill, N.J., a corporation of New York Filed Apr. 25, 1969, Ser. No. 819,266
Int. Cl. G02b *5/14;* H01p *3/20, 5/14*
U.S. Cl. 350—96 8 Claims

ABSTRACT OF THE DISCLOSURE

This application describes a variety of circuit components for use at optical frequencies. Each of the components is formed from one or more transparent dielectric strips embedded in a transparent substrate of slightly lower refractive index. By suitably shaping and locating the guiding strips, modulators, directional couplers, and a variety of filters can be realized. Tuning arrangements are also disclosed.

This invention, related to my copending application, Ser. No. 750,816, filed Aug. 7, 1968, discloses a variety of optical circuits involving the use of thin strip waveguides for guiding optical wave energy.

BACKGROUND OF THE INVENTION

In my copending application Ser. No. 730,192, filed May 17, 1968, there is described a dielectric waveguide for guiding electromagnetic wave energy in the infrared, visible and ultraviolet portions of the frequency spectrum, referred to collectively as "optical" waves. Such waveguides are of particular interest in that they are very small and can be manufactured very inexpensively using currently available solid state fabricating techniques. However, for this type of waveguide to be useful in a communication system, circuit elements must be devised that are both capable of performing such circuit functions as modulation, power dividing, channel dropping, band passing, band rejecting, etc. and are, at the same time, consistent with the waveguide structure.

SUMMARY OF THE INVENTION

In accordance with the present invention, filters of various types are described which comprise a combination of a few basic optical circuit components including reactive terminations, directional couplers, power dividers and a novel type of disc resonant cavity. For example, a directional coupler can be formed by either two waveguiding dielectric strips of specified length hand spacing, or by two intersecting strips. In the former arrangement, the power division ratio varies as a function of the length of the coupling interval and the spacing between strips. In the second arrangement the power division ratio varies as a function of the angle of intersection.

Either coupler can be converted to a reactive termination by interconnecting one of the two pairs of conjugate branches of the coupler. Alternatively, longitudinally dividing a single strip into two branches, which are then connected together at their respective ends to form a closed loop, also produces a reactive termination. Terminations of this type are used in lieu of mirrors, and have the advantage of being much simpler and, hence, less expensive to fabricate.

Various filter arrangements are described employing combinations of resonant discs, directional couplers and reactive terminations.

These and other objects and advantages, the nature of the present invention, and its various features will appear more fully upon consideration of the various illustrative embodiments now to be described in detail in connection with the accompanying drawings.

DETAILED DESCRIPTION

Directional couplers

Figure 1:
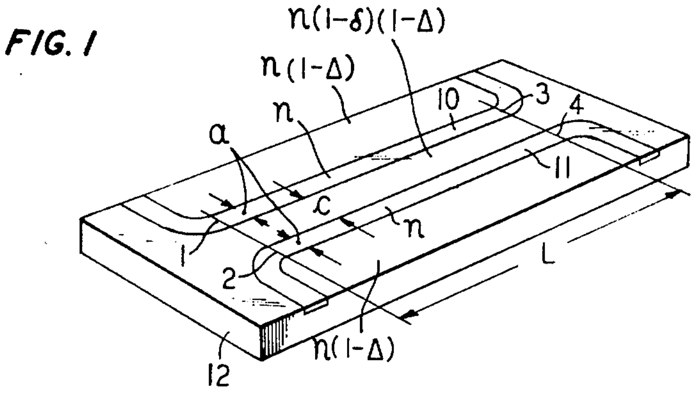
FIGS. 1 and 2 show two embodiments of a directional coupler.

Before proceeding with a discussion of the various circuits, a number of basic circuit elements, used to form these circuits, are described. Of these, the first element, illustrated in FIG. 1, is a directional coupler comprising two transparent (low-loss) dielectric strips 10 and 11, embedded in a second transparent dielectric material 12 of lower refractive index. The strips are either totally embedded in substrate 12, n which case the second dielectric material is in contact with all the surfaces of strips 10 and 11, or alternatively, the strips are only partially embedded in the substrate, in which case the second dielectric material is in contact with only some of the strip surfaces. In the illustrative embodiment of FIG. 1, the strips are partially embedded with the upper surface of each strip exposed to the surrounding medium which, typically, is air. A third dielectric material may be placed in contact with, or in close proximity to the exposed strip surface to modify the electrical length of the strip, as will be explained in greater detail hereinbelow.

The strips, which are normally widely spaced apart, extend relatively close to each other over a coupling interval L. The power coupled between the strips is a function of their refractive index $n$; the coupling interval L; the width $a$ of the strips; their separation $c$; and the refractive index of the substrate. Total transfer of power is obtained when $$\frac{\pi}{2L}=\sqrt{\frac{8\Delta}{A}}\left[\frac{2}{\pi}+\frac{a}{A}\right]^{-3}e^{\frac{-\pi c}{A}\sqrt{1-\delta-\left[\frac{2}{\pi}\left(1-\frac{\delta}{4}\right)+\frac{a}{A}\right]^{-2}}} \quad (1)$$

where $$A=\frac{\lambda}{2^{3/2}n\sqrt{\Delta}}$$

$\lambda$ is the free space wavelength of the guided wave energy;

$n(1-\Delta)(1-\delta)$ is the refractive index of the region of the substrate between the guiding strips; and $n(1-\Delta)$ is the refractive index of the rest of the substrate.

For the particular case where $\Delta=0.01$, $\delta=0$, $n=1.5$ and $a=c=A$, the coupling interval L for total power transfer is equal to $700\lambda$. For a 3 db coupler, $L/2=350\lambda$, or odd multiples thereof.

The length of the coupling interval necessary to couple a given amount of power between strips can be conveniently varied by controlling the refractive index of the region of the substrate between the strips. For example, if $\delta=0.17$, the coupling length is reduced to one-half of that computed above for $\delta=0$.

Figure 2:
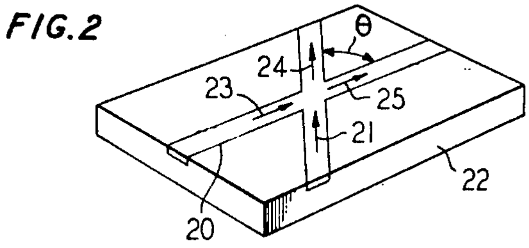

FIG. 2 shows a second embodiment of a directional coupler in accordance with the present invention comprising two crossed guiding strips 20 and 21 embedded in a dielectric substrate 22. When the angle $\theta$ between strips is equal to 90 degrees, none of the power propagating along either strip is coupled to the other strip. As the angle of intersection decreases, the power coupled between strips increases, reaching a maximum value of one-half as $\theta$ approaches zero. Neglecting losses, the power coupled varies approximately as the square of the cosine of the angle between the strips. Thus, in operation, a signal of amplitude E, propagating along strip 20, as represented by arrow 23, divides at the intersection of strips 20 and 21. Neglecting losses, a signal component proportional to $0.707E\cos^2\theta$, represented by arrow 24, is coupled to strip 21. The balance of the signal represented by arrow 25 continues to propagate along strip 20.

In the remaining description that now follows, the illustrative circuit components and transmission lines in each of the embodiments shall be understood to comprise, as in FIG. 1, a transparent guiding strip partially or totally embedded in a transparent dielectric substrate of lower refractive index. However, in order to simplify the discussion, reference will be made only to the guiding strip portion of the transmission line, it being understood at all times, that the guiding strip is embedded in a suitable substrate.

REACTIVE TERMINATIONS

Figure 3:
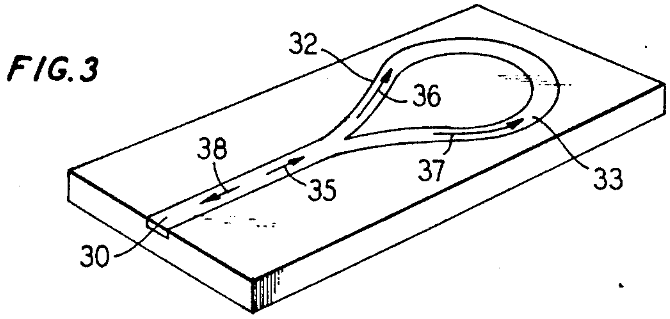
FIGS. 3 and 4 show arrangements for reactively terminating a dielectric waveguide.

FIG. 3 shows a first embodiment of a reactive termination for use with a dielectric waveguide. In accordance with the invention, the termination is formed by longitudinally dividing the guiding strip 30 into two branches 32 and 33, which are joined together at their respective ends to form a closed loop.

In operation, the incident wave energy, indicated by arrow 35, divides into two components 36 and 37 in branches 32 and 33, respectively. The components traverse identical paths around the loop and recombine in strip 30 into a single beam 38 propagating in the opposite direction. The effect, therefore, is that all the incident wave energy is reflected by the loop. Advantageously, branching is accomplished over an extended interval, with the transverse dimension of strip 30 increasing gradually as division occurs.

Figure 4:
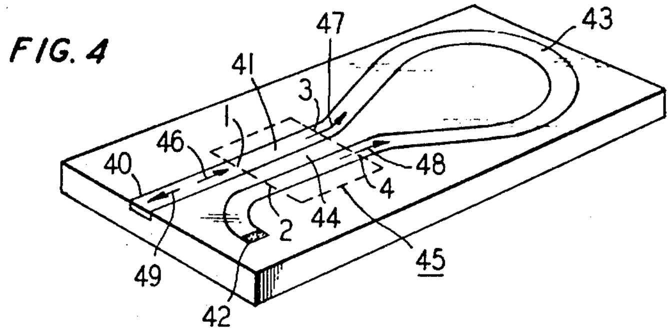

FIG. 4 shows an alternative embodiment of a reactive termination using a 3 db coupler of the type shown in FIG. 1. In this embodiment, a guiding strip 40 is coupled to branch 1 of a 3 db coupler 45 formed by means of a pair of coextensively extending dielectric strips 41 and 44. Branch 2, which is conjugate to branch 1, is advantageously resistively terminated by means of a lossy material 42. The second pair of conjugate branches 3 and 4 of coupler 45 are coupled together by means of a second guiding strip 43.

In operation, an input signal $E/\underline{0}$, represented by arrow 46, is coupled to coupler 45 wherein it is divided into two equal components $0.707E/\underline{0}$ and $0.707E/\underline{90}$, represented by arrows 47 and 48, respectively. Component 47 is guided to branch 4 of coupler 45 by means of guide strip 43 wherein it is further divided to produce a component $0.5E/\underline{90+\theta}$ in branch 1 and a component $0.5E/\underline{0+\theta}$ in branch 2, where $\theta$ is the phase shift produced in guide strip 43.

Similarly, component 48 is guided to branch 3 of coupler 45 by means of guide strip 43 wherein it also is divided to produce a component $0.5E/\underline{90+\theta}$ in branch 1 and a component $0.5E/\underline{180+\theta}$ in branch 2. Since the two components in branch 1 have the same phase, they add constructively to produce an output signal 49 equal to $E/\underline{90+\theta}$. The two components in branch 2, on the other hand, being 180 degrees out-of-phase, add destructively to produce, ideally, no signal in branch 2. Resistive termination 42 absorbs any resultant signal that may be produced in branch 2 due to any imbalance in the system.

RESONANT CAVITY

Figure 5A:
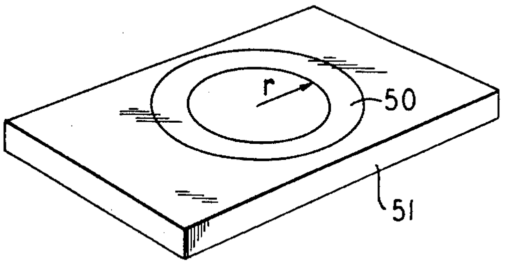
FIGS. 5A and 5B show resonant cavity structures.
Figure 5B:
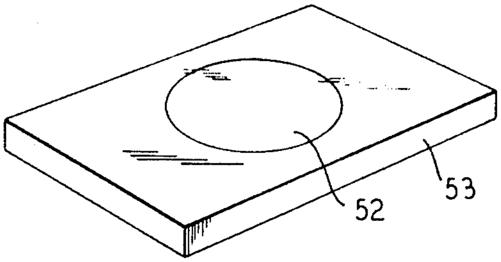

The final circuit elements to be considered are the resonant cavity structures of FIGS. 5A and 5B. The cavity embodiment of FIG. 5A comprises a closed, circular loop of guide strip 50, embedded in substrate 51. The loop can, in general, have any shape, as will be illustrated in the various circuits to be considered in greater detail hereinbelow.

The second cavity embodiment, shown in FIG. 5B, is a modification of the loop cavity wherein the inside loop radius, $r$, is zero. This so-called "pillbox" cavity is based upon the recognition that when the width of guiding strip 50 is large compared to the wavelength of the signal, most of the electromagnetic field tends to propagate close to the outer edge of the loop. Thus, the location of the inner edge of the loop no longer plays an important role in the guidance process and, hence, can be reduced to zero. This converts the loop cavity of FIG. 5A to the pillbox cavity of FIG. 5B comprising a disc 52 of dielectric material embedded in a substrate 53.

It is an advantage of the pillbox cavity that it is much simpler and, therefore, less expensive to fabricate. In addition, it has a smaller radius than a loop cavity having the same radiation loss.

BAND-REJECTION FILTERS

Figure 6:
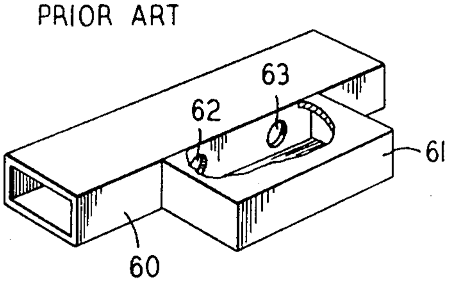
FIG. 6 PRIOR ART
FIG. 6, included for purposes of explanation, shows a prior art microwave band-rejection filter.

Basically, all embodiments of the filter now to be described are the equivalent of the prior art microwave band-rejection filter shown in FIG. 6. In general, the latter comprises a section of rectangular waveguide 60 and a standing wave resonant cavity 61 tuned to the center of the frequency band to be rejected. Coupling between waveguide 60 and cavity 61 is provided by means of a pair of longitudinally spaced coupling apertures 62 and 63. Typically, the bandwidth of the rejected band varies as a function of both the size of the apertures and their spacing.

With certain modifications, dictated by the much shorter wavelengths at optical frequencies, each of the filters now to be described is similar to the microwave filter in that each includes a transmission line coupled, by means of a pair of spaced coupling regions, to a resonant cavity that is tuned, generally, to the center of the frequency band to be rejected. However, whereas a microwave cavity can be made of the order of a wavelength long, this cannot be conveniently done at optical frequencies. In addition, even relatively short coupling intervals assume traveling wave characteristics at optical frequencies and become directional, thus causing the coupled wave energy to propagate in only one direction within the cavity. Because of these differences, a filter at optical frequencies cannot be made by the simple expedient of scaling down the dimensions of a microwave filter.

Figure 7A:
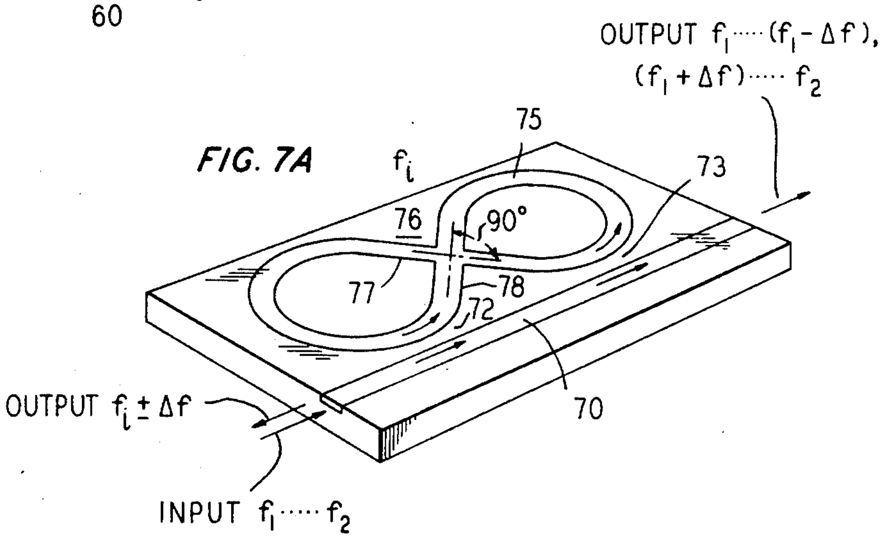
FIGS. 7A, 7B, 8A, 8B, 8C, 9, 10, 11, 12 and 13 show various embodiments of band-rejection filters in accordance with the invention.

FIG. 7A shows a first embodiment of a band-rejection filter in accordance with the present invention. The filter includes a transmission line, comprising a dielectric strip 70, coupled to a figure-eight resonant cavity 76 along two, longitudinally spaced coupling intervals 72 and 73.

Cavity 76 can be formed in either of two ways. In a first arrangement, the two portions 77 and 78 of the figure-eight at the crossover region are physically separated from each other by means of a layer of transparent dielectric material. In a second arrangement, such as is illustrated in FIG. 7A, the two portions 77 and 78 intersect. In this latter case the crossover is made with the two portions at right angles to each other in order to avoid cross-coupling.

As was explained hereinabove in connection with FIG. 1, at optical frequencies coupling between strips, even over very small physical intervals, produces directional coupling. Thus, wave energy coupled between transmission line strip 70 and the cavity strip 75 at each of the two coupling intervals, produces a traveling wave which propagates away from each of the coupling intervals in only one direction. In order to produce a standing wave in cavity 76, the filter structure is arranged such that the two coupled waves propagate in opposite directions along strip 75. In the embodiment of FIG. 7A this is accomplished by the figure-eight configuration of cavity 76.

In operation, a signal, having frequency components which extend over a band of frequencies between $f_1$ and $f_2$, propagates along strip 70. A small portion of this wave energy is coupled into cavity 76 at each of the coupling intervals 72 and 73. As indicated by the arrows along the cavity strip 75, the coupled energy is directional and propagates away from the coupling regions in the indicated directions. Because of the figure-eight configuration of cavity 76, however, the two propagating waves flow along strip 75 in opposite directions to form a standing wave which builds up at the cavity resonant frequency $f_i$.

In a microwave band-rejection filter of the type shown in FIG. 6, the bandwidth of the rejected band varies as a function of both the spacing between coupling apertures and the coefficient of coupling of the apertures. In the embodiment of FIG. 7A, however, the bandwidth is independent of the spacing between coupling intervals 72 and 73, and depends only upon the coupling coefficient.

Designating the filter bandwidth as $2\Delta f$, the rejected frequencies, $f_1 \pm \Delta f$, are reflected back along strip 70. The balance of the signal frequencies continues along strip 70.

Figure 7B:
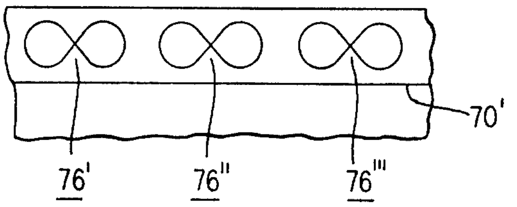

In order to control the shape of the rejected band, a plurality of cavities can be cascaded as shown schematically in FIG. 7B. In this embodiment, three cavities 76', 76" and 76''' are coupled to transmission line 70'. The cavities can be tuned to either the same frequency or stagger tuned to different frequencies.

Because cavity 76 is so long relative to the wavelength of the signal energy, it is a multi-frequency cavity and, hence, is resonant at a plurality of frequencies for which its length is equal to integral multiples of half a wavelength. Preferably, cavity 76 is made short enough so that the next adjacent resonance falls outside the band $f_1 \ldots f_2$. However, as the curvature of the loop is reduced in an effort to decrease the overall size of the cavity, the radiation losses tend to increase.

Figure 8A:
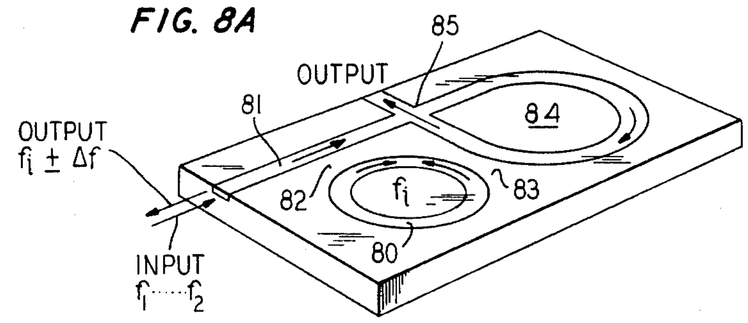

These conflicting limitations are partially resolved by the arrangement of FIG. 8A. In this embodiment a circular loop cavity 80, which is approximately half the size of the figure-eight cavity of FIG. 7A, is used. In order to provide two coupling intervals for coupling wave energy into cavity 80 in opposite directions, the transmission line strip 81 is formed in a loop 84. One coupling interval 82, between cavity 80 and strip 81, is located along strip 81 outside loop 84. The second region 83, for coupling between cavity 80 and strip 81, is located along the loop. To avoid any cross-coupling, the crossover can be made with either the two ends of loop 84 intersecting at right angles to each other, as shown, or by physically separating the two ends by means of a layer of low-loss material.

Figure 8B:
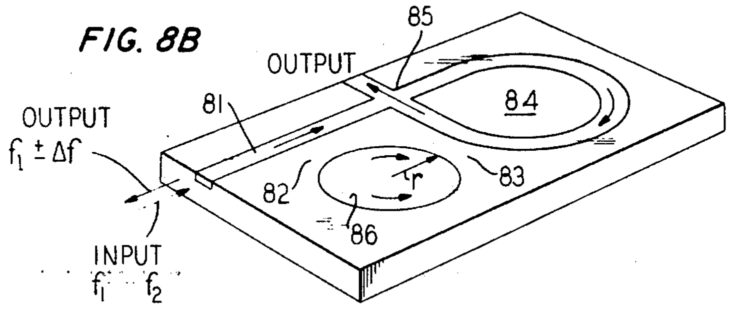

The filter embodiment of FIG. 8B is essentially the same as that shown in FIG. 8A, with the exception that the loop cavity 80 is replaced with a pillbox cavity 86. In either embodiment, the cavity is tuned to a frequency within the band of frequencies to be rejected. In the loop cavity, the loop length is an integral multiple of the guide wavelength of the frequency of interest. In the pillbox cavity, the outer periphery or circumference, $2\pi r$, of the disc is made equal to an integral multiple of the guided wavelength at the frequency of interest, where $r$ is the disc radius. In practice, at optical frequencies where the wavelengths are so small, any convenient size cavity can be used, and tuning accomplished in the manner to be explained hereinbelow.

Figure 8C:
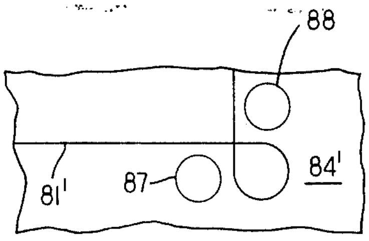
Figure 9:
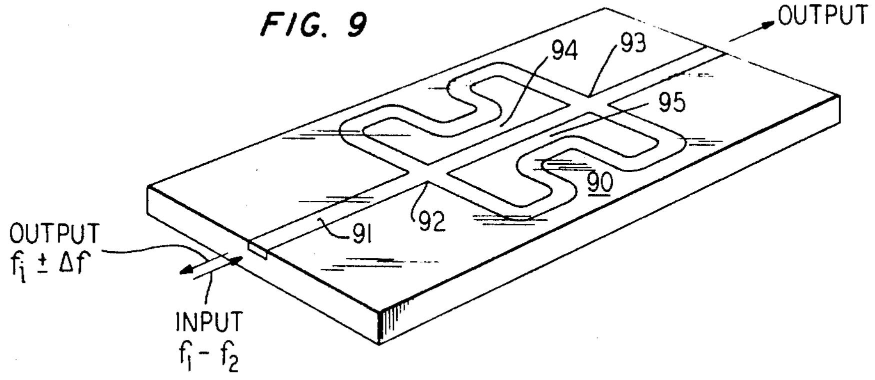

A second cavity can be coupled to the system as shown schematically in FIG. 8C wherein two cavities 87 and 88 of either the loop or pillbox variety are coupled to transmission line 81' and loop 84'. As in the previous embodiment shown in FIG. 7B, the cavities can be tuned to the same frequency or to different frequencies.

FIGS. 9, 10, 11, 12 and 13 show various additional alternative embodiments of band-rejection filters in accordance with the invention. In the first of these additional embodiments, shown in FIG. 9, the cavity 90 intersects the transmission line 91 at right angles at two longitudinally spaced positions 92 and 93. In between these two positions, the transmission line is directionally coupled to both sides of the intersected cavity along two coupling intervals 94 and 95. As in the embodiments of FIGS. 7 and 8, the signals coupled into cavity 90 at the two coupling intervals flow in opposite directions.

To avoid spurious coupling between cavity 90 and transmission line 91, they are alternatively, physically and electrically isolated from each other at the crossover positions 92 and 93 by placing a layer of low-loss dielectric material between them. In this latter arrangement, the angle between the cavity and the transmission line at the two crossover positions can be different than 90 degrees.

Figure 10:
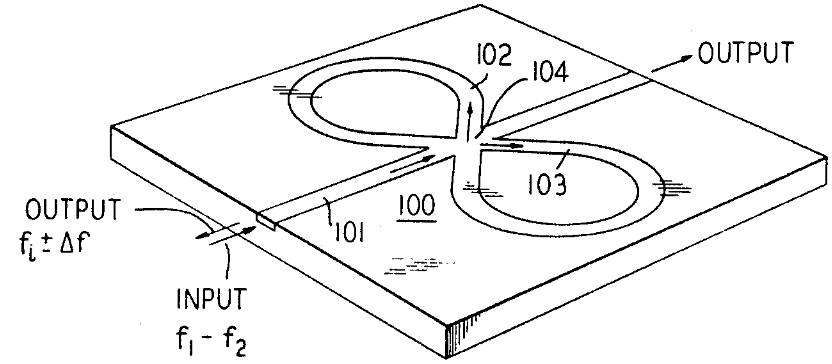

In the embodiment of FIG. 10, the cavity 100 is in the form of a right angle figure-eight, with each one of the loops of the figure-eight symmetrically disposed on opposite sides of an intersecting transmission line 101. In order to preclude any cross-coupling between strip portions 102 and 103 of cavity 100 at the crossover region 104, strip portions 102 and 103 intersect at right angles. To produce equal coupling between the transmission line and each of the strip portions, transmission line 101 intersects the cavity at the crossover region 104 so as to bisect the angle between strip portions 102 and 103.

The disadvantage of the embodiment of FIG. 10 lies in the fact that the coupling angle between the transmission line and cavity 100 is fixed at 45 degrees. The coupling can be reduced, however, by the addition of a dielectric spacer between the cavity and the transmission line at the crossover.

Figure 11:
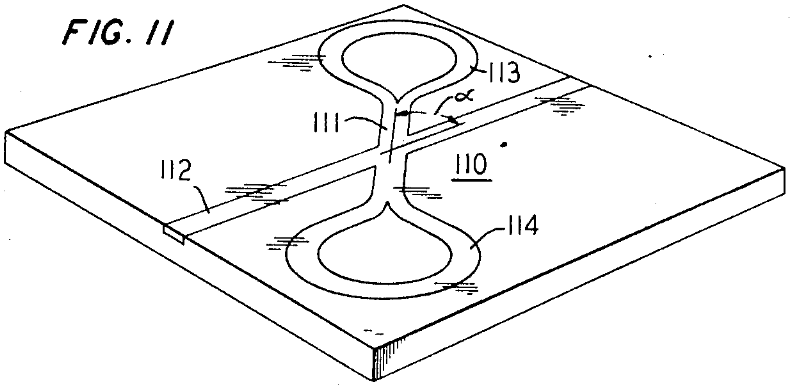
Figure 13:
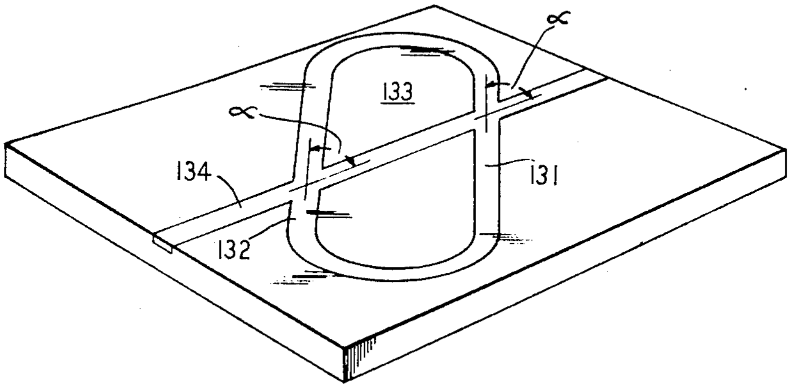

Alternative embodiments which permit freedom in selecting the angle of intersection and, hence, the coupling between the cavity and transmission line are shown in FIGS. 11 and 13.

In the embodiment of FIG. 11, the cavity 110, which comprises a length of transmission line 111 reactively terminated at both ends, can be made to intersect the transmission line 112 at any arbitrary angle. The particular cavity terminations 113 and 114 used in this embodiment are those illustrated in FIG. 3. Alternatively, the termination arrangement of FIG. 4 can also be used.

Figure 12:
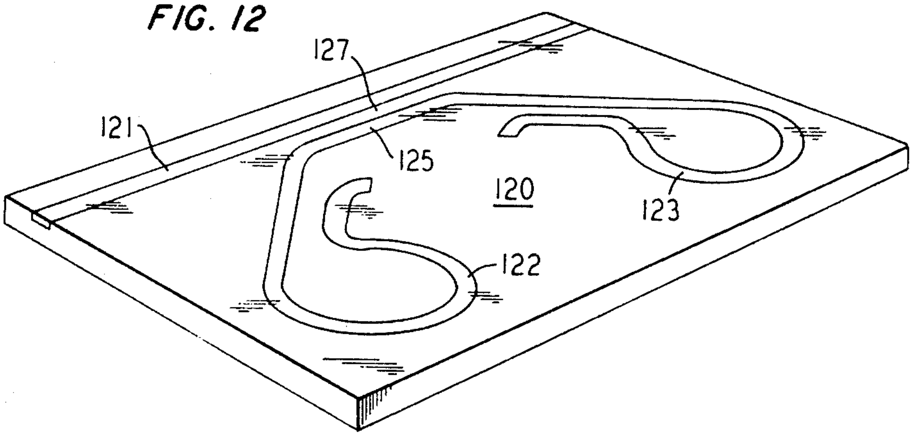

FIG. 12 is a modification of the filter of FIG. 11 in which the cavity, which comprises a length of transmission line 125 reactively terminated at both ends, is directionally coupled to the signal wavepath 121 over a coupling interval 127. In this embodiment, reactive terminations 122 and 123 are of the variety illustrated in FIG. 4.

In the embodiment of FIG. 13, the cavity 133 is in the form of an oval that intersects the transmission line 134 at two longitudinally spaced locations. To insure equal coupling at the two intersections, the angle of intersection $\alpha$ between the transmission line and the cavity segments 132 and 131 is equal. The smaller the angle the greater is the coupling and the larger is the bandwidth of the filter.

Though not shown, it is understood that in each of the above-described filters, a plurality of cavities can be cascaded along the wavepath to control the shape of the filter, and that the cavities can be tuned to either the same frequency or to different frequencies as each particular application may require.

BAND-PASS FILTER

Figure 14:
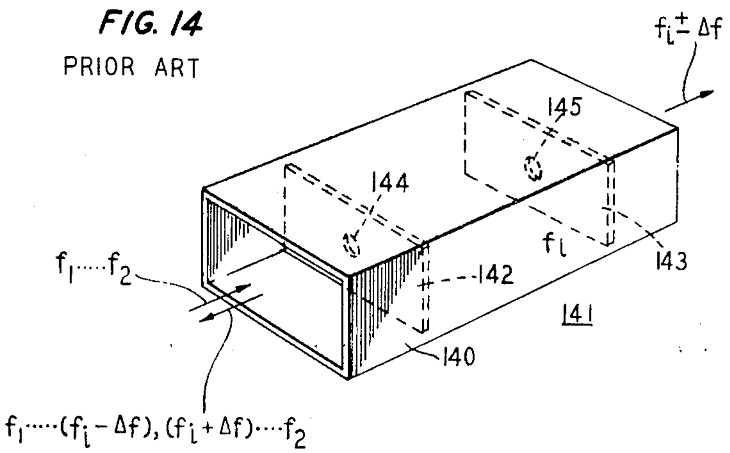
FIG. 14 PRIOR ART
FIG. 14, included for purposes of explanation, shows a prior art microwave band-pass filter.

FIG. 14, included for purposes of explanation, shows a typical microwave band-pass filter comprising a section of rectangular waveguide 140 in which there is located a cavity 141. The latter is formed by means of a pair of longitudinally spaced reactances consisting of metallic septa 142 and 143 containing coupling holes 144 and 145.

In operation, a signal having components between frequencies $f_1$ and $f_2$, and propagating along waveguide 140, is incident upon cavity 141. The latter, tuned to a frequency $f_i$ within said band, passes only signal components within the band $f_i \pm \Delta f$, where the cavity bandwidth $2\Delta f$ is a function of the coefficients of coupling of apertures 144 and 145. The remaining signal components $f_1 \ldots (f_i - \Delta f)$, $(f_i + \Delta f) \ldots f_2$ are reflected by the filter.

Figure 15A:
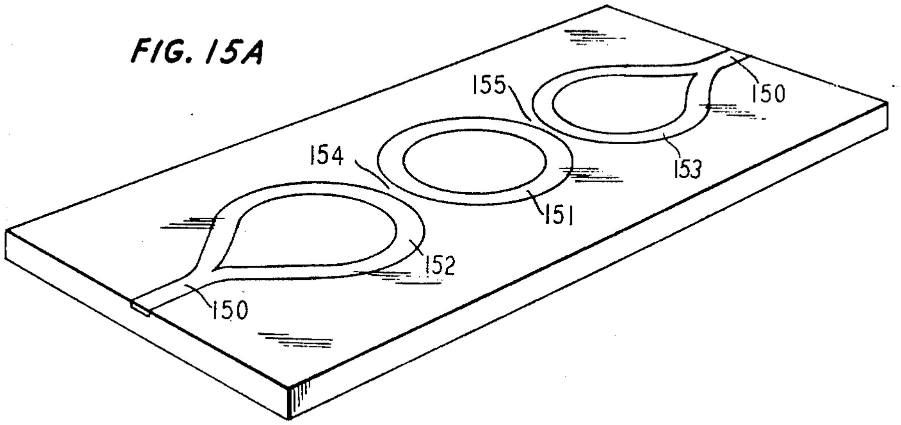
FIGS. 15A, 15B and 15C show band-pass filters in accordance with the invention.

FIG. 15A shows an optical frequency band-pass filter in accordance with the present invention. Comparing elements of the latter with the filter shown in FIG. 14, strip 150 corresponds to waveguide 140; cavity 151 corresponds to cavity 141; loops 152 and 153 correspond to septa 142 and 143; and the coupling intervals 154 and 155 between cavity 151 and loops 152 and 153, respectively, correspond to coupling apertures 144 and 145.

The bandpass of the filter shown in FIG. 15A is determined by the frequency $f_i$ at which cavity 151 resonates, and the coupling (loading) defined by coupling intervals 154 and 155. The operation of this filter is the same as the filter of FIG. 14.

Figure 15B:
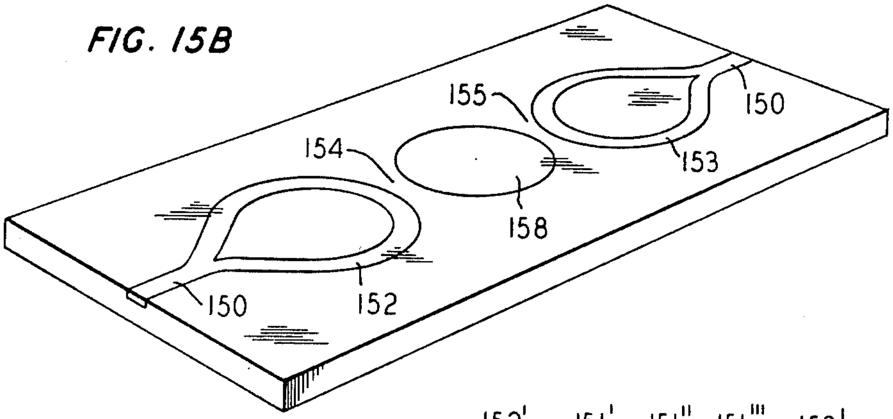

FIG. 15B shows a band-pass filter wherein the loop cavity 151 of FIG. 15A is replaced by a pillbox cavity 158. In all other respects the two filters are the same.

Figure 15C:
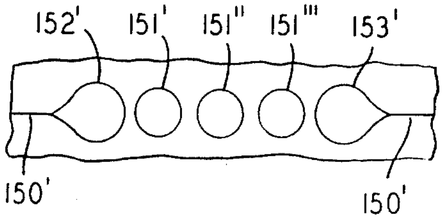

It will be recognized that the loop terminations 152 and 153 can, alternatively, be replaced by the termination shown in FIG. 4. In addition, the shape of the passband can be controlled by employing a plurality of cavities as indicated schematically in FIG. 15C wherein three cavities 151′, 151″ and 151‴ are shown cascaded between line-terminating loops 152′ and 153′. The cavities can be tuned to the same frequency or can be stagger-tuned to different frequencies.

CHANNEL-DROPPING FILTERS

Figure 16:
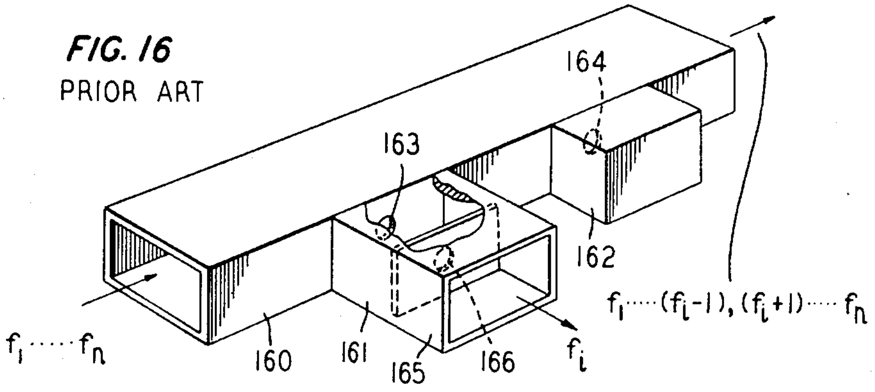
FIG. 16 PRIOR ART
FIG. 16, included for purposes of explanation, shows a prior art microwave channel-dropping filter.

The third filter structure now to be considered is the channel-dropping filter wherein one of a plurality of channels is separated from the others. FIG. 16 shows a typical prior art channel-dropping filter, for use at microwave frequencies, comprising a section of rectangular waveguide 160, and a pair of longitudinally spaced cavities 161 and 162. The latter, tuned to the frequency $f_i$ of the channel to be dropped, are longitudinally spaced a distance $$(2n+1)\frac{\lambda_i}{4}$$

apart, where $n$ is an integer, and $\lambda_i$ is the guide wavelength at frequency $f_i$.

Suitable means, such as apertures 163 and 164, are provided for coupling between cavities 161 and 162 and transmission line 160. The channel to be dropped is coupled from one of the cavities 161 to an output waveguide 165 by means of a second coupling aperture 166 in cavity 161. The remaining channels $f_1 \ldots f_{i-1}$, $f_{i+1} \ldots f_n$ continue propagating along waveguide 160.

Figure 17:
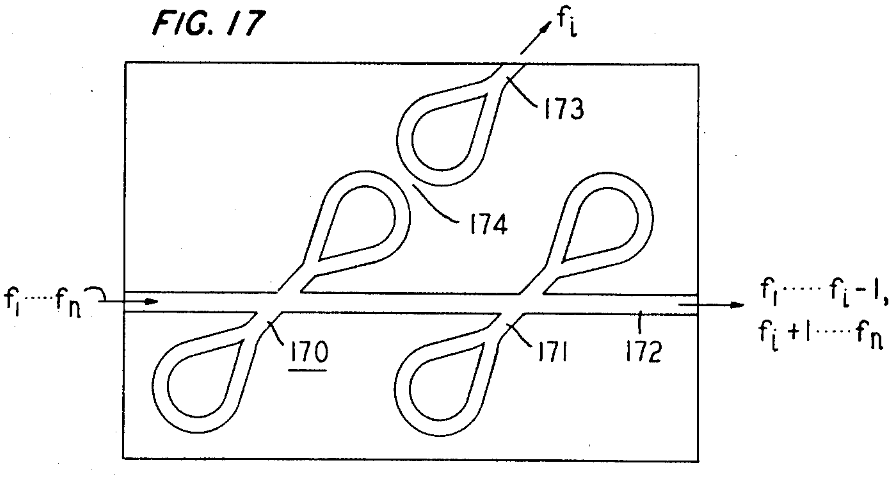
FIG. 17, shows a channel-dropping filter in accordance with the invention.

An optical channel-dropping filter, in accordance with the present invention, comprises an optical transmission line, a pair of longitudinally spaced cavities, of the types disclosed in FIGS. 7–13, and a second transmission line coupled to one of said cavities. One specific embodiment of such a filter is shown in FIG. 17 wherein two longitudinally spaced cavities 170 and 171, of the type shown in FIG. 11, are coupled to a transmission line 172. The dropped channel is coupled out of cavity 170 by means of a loop-terminated line 173. Coupling between cavity 170 and line 173 is along the adjacent region 174 therebetween.

As indicated above, any of the other cavities described herein, or combinations thereof, can be used instead of the particular cavity shown. Similarly, the open loop-termination of FIG. 3 can be used instead of the closed-loop arrangement of FIG. 1.

The use of two cavities in each of the channel-dropping filters shown in FIGS. 16 and 17 is necessary if all the energy at frequency $f_i$ is to be extracted from the circuit. For example, if the second cavity 162 in FIG. 16 was not included, the energy coupled into waveguide 160 from cavity 161 through aperture 163 would propagate away from cavity 161 in both the forward and backward directions. The coupled component that propagates in the forward direction would be partially canceled by a portion of the incident wave. There would be, however, no waveguide signal propagating in the backward direction to cancel the backward propagating signal component. To provide such a signal is the function of the second cavity 162. Similarly, in the embodiment of FIG. 17, cavity 171 is included to cancel the backward propagating signal component coupled onto line 172 by cavity 170.

It is clear from the above discussion that a second cavity is required only because the first cavity coupled wave energy back into the main transmission path in the backward direction. Thus, if the bidirectional coupling could be eliminated, the second cavity could also be eliminated.

It will be recalled, from the description of the directional coupler shown in FIG. 1, that, at optical frequencies, coupling over very small physical intervals tends to be directional. This feature, in fact, made it necessary to provide two coupling regions in the band-rejection filters described above. This feature can also be used to good effect as a means of eliminating the second cavity in a channel-dropping filter, as will be explained in connection with FIG. 18A.

Figure 18A:
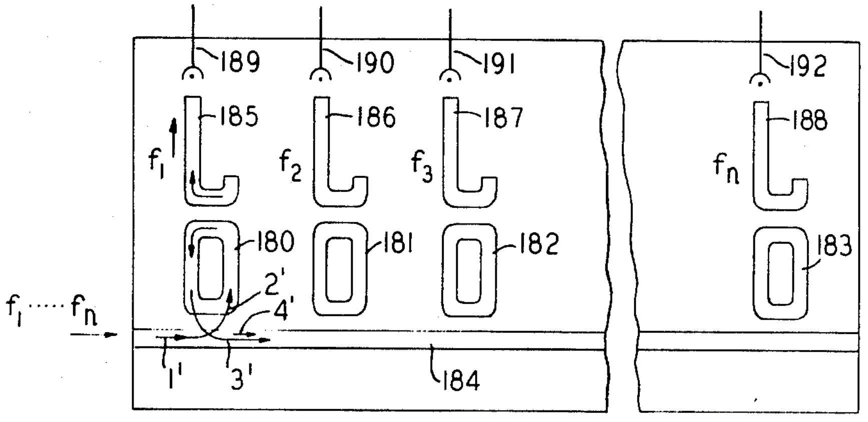
FIGS. 18A and 18B show alternative embodiments of a channel-dropping filter using only one cavity per channel.

In the embodiment of FIG. 18A, a plurality of longitudinally spaced cavities 180, 181, 182 and 183 are directionally coupled to a transmission line 184. Each cavity is tuned to a different one of the channels $f_1 \ldots f_n$. The dropped channel is directionally coupled out of the respective cavities and into separate output circuits 185, 186, 187 and 188.

In operation, a small portion of the incident signal is coupled into the first cavity 180. The balance of the signal tends to continue along line 184. Because of the directional nature of the coupling, the coupled energy propagates around cavity 180 in only one direction. For purposes of explanation and identification, the incident signal is indicated by arrow 1′; the coupled signal portion by arrow 2′; and the uncoupled signal portion by arrow 4′. The signal at frequency $f_1$, at which cavity 180 is resonant, builds up and couples back into transmission line 184, as indicated by arrow 3′. However, because the coupling is directional, the signal coupled back onto the transmission line propagates only in the forward direction where it cancels the uncoupled portion 4′ of the $f_1$ signal. Thus, by utilizing the directional properties of small coupling lengths at optical frequencies, single cavity channel-dropping filters can be realized.

Each of the dropped channels is directionally coupled out of the respective cavities and into output circuits 185, 186, 187 and 188. Each of the optical signals thus obtained can then be detected by suitable means such as, for example, photodiodes 189, 190, 191 and 192. Alternatively, a film traveling perpendicular to the paper is simultaneously exposed to all of the output circuits, and records a continuous spectral analysis of the signal.

Figure 18B:
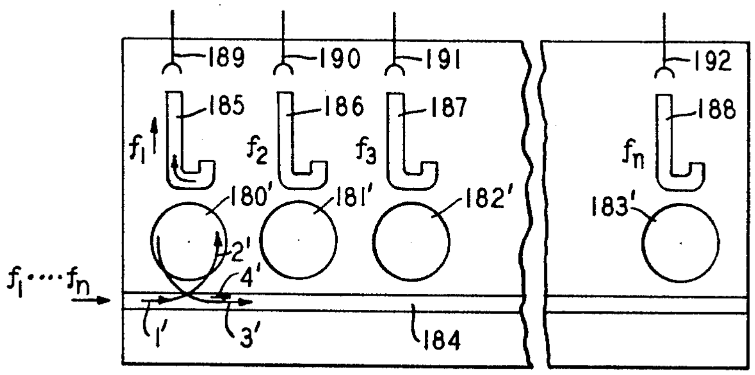

As explained above, each of the cavities 180, 181, 182 and 183 can be replaced by a plurality of cavities, cascaded between transmission line 184 and each of the respective output circuits, as a means of shaping the pass band of each of the channels. In addition, the cavities can be either the loop variety, as shown in FIG. 18A, or the disc variety, as illustrated in FIG. 18B. In this latter figure, the loop cavities 180, 181, 182 and 183 of FIG. 18A have been replaced by disc cavities 180′, 181′, 182′ and 183′, respectively. In all other respects, the filters of FIGS. 18A and 18B are identical.

TUNING

In all of the illustrative embodiments discussed thus far, the cavities were assumed to be resonant at the exact frequency of interest. As a practical matter this could not be readily achieved without an unusual degree of precision in the manufacturing process. It is, accordingly, advantageous to provide some means for tuning the cavities. This, in addition to relaxing the manufacturing tolerances and, thereby, reducing manufacturing cost, makes it possible to change the frequency response of the filter and, as will be shown, makes possible a number of variable circuit elements such as variable attenuators, modulators, variable power dividers, and switches.

Figure 19:
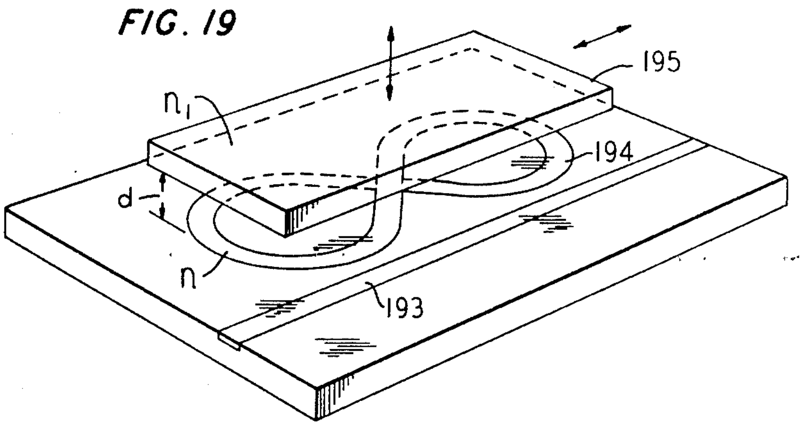
FIG. 19 shows a mechanical arrangement for tuning a cavity.

A first mechanical method of tuning is illustrated in FIG. 19, which shows, for purposes of illustration, the band-rejection filter of FIG. 7A comprising a transmission line 193 and a figure-eight cavity 194 made of a material having a refractive index $n$. Tuning is accomplished by bringing a transparent (low-loss) dielectric member 195 having a refractive index $n_1<n$ in close proximity to the cavity.

The closer the tuning member is to the cavity (the smaller the spacing $d$) or the greater the area of the cavity that is covered by the tuning member, the lower the frequency. Thus, tuning can be accomplished by either a vertical movement of the tuning member, which changes the distance $d$, or by a horizontal movement which varies the proportion of the cavity covered by the tuning member.

Figure 20:
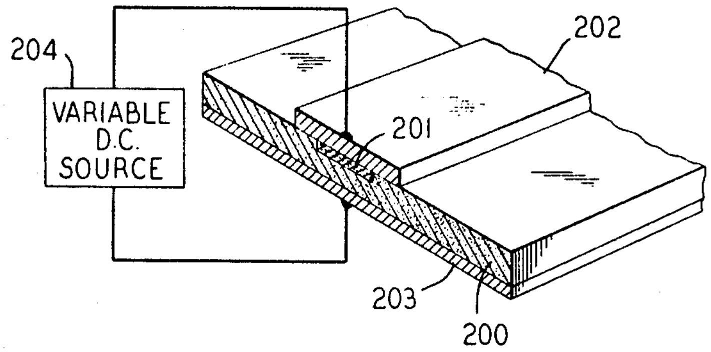
FIG. 20 shows an alternative tuning arrangement.

An alternative arrangement involves electrically varying the refractive indices of the guiding strip and/or the substrate of the circuit portion to be tuned. One such arrangement is illustrated in FIG. 20, which shows the cross-section of a dielectric waveguide comprising a substrate 200 and a guiding strip 201. The waveguide can be a portion of any of the circuit members described hereinabove.

If either or both the guiding strip 201 and the substrate 200 are made of an electro-optic material, the electrical length of the guide can be varied by applying a variable electric field to the electro-optic material. This can be conveniently done by means of a pair of electrodes 202 and 203 placed on opposite sides of the dielectric waveguide and connected to a variable direct current source 204.

Basically, both of the tuning arrangements described above have the effect of changing the electrical length of the waveguide, i.e., change the phase shift through the waveguide. This phenomenon can thus be used for a variety of purposes in addition to tuning a cavity.

While various circuits are primarily intended for use at optical frequencies and have been described with particular reference to the dielectric waveguide described in my above-identified copending application, it will be readily recognized that the specific embodiments described herein can be implemented at other than optical frequencies and with other waveguiding structures such as conductively bounded waveguides and strip transmission lines. Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

I claim:

1. A band-rejection filter for electromagnetic wave energy, comprising:
   - a length of transmission line;
   - at least one resonant cavity tuned to a frequency within the band of frequencies to be rejected;
   - characterized in that:
     - said transmission line comprises a low-loss dielectric substrate having an elongated, low-loss dielectric strip of higher refractive index than said substrate embedded therein;
     - said cavity comprises low-loss dielectric substrate having a low-loss dielectric disc of higher refractive index than said substrate embedded therein; and
     - in that said line is in coupling relationship with said cavity at two locations for inducing a pair of oppositely-propagating traveling waves in said cavity.

2. The filter according to claim 1 wherein said transmission line includes a loop, and
   - wherein each cavity is directionally coupled to said line along a first region outside said loop and along a second region within said loop.

3. The filter according to claim 2 wherein a pair of cavities are coupled to said transmission line.

4. A band-pass filter for electromagnetic wave energy comprising:
   - first and second reactively-terminated transmission lines;
   - said termination including a region wherein equal components of said wave energy propagate in opposite directions therealong;
   - at least one resonant cavity tuned to the band of frequencies to be passed;
   - characterized in that said cavity is a disc of low-loss dielectric material embedded in a substrate of low-loss dielectric material of lower refractive index; and
   - in that said wave energy is directionally coupled between said cavity and said terminations.

5. The filter according to claim 4 wherein said transmission lines comprise a low-loss dielectric substrate and an elongated, low-loss dielectric guiding strip of higher refractive index embedded therein.

6. The filter according to claim 5 including a plurality of resonant disc cavities cascaded between said lines wherein each of said cavities is directionally coupled to the next adjacent cavity.

7. A channel-dropping filter for electromagnetic wave energy, comprising:
   - an input and at least one output transmission line, each comprising a low-loss dielectric substrate and an elongated, low-loss dielectric guiding strip of higher refractive index embedded therein;

at least one resonant cavity tuned to the channel to be dropped;

characterized in that said cavity comprises a low-loss dielectric substrate and a low-loss dielectric disc of higher refractive index embedded therein; and in that each cavity is directionally coupled to both said input and an output transmission line.

8. The filter according to claim 7 wherein a plurality of disc cavities, each tuned to a different channel, are directionally coupled to a common input transmission line; and wherein each of said cavities is directionally coupled to a different output transmission line.

References Cited

UNITED STATES PATENTS

| | | | |
|---|---|---|---|
| 2,794,959 | 6/1957 | Fox | 333—10 |
| 2,854,636 | 9/1958 | Marie | 333—10 |
| 3,074,033 | 1/1963 | Smith | 333—10 |
| 3,208,342 | 9/1965 | Nethercot | 350—(96(WG))UX |
| 3,408,131 | 10/1968 | Kapany | 350—96 |
| 3,456,213 | 7/1969 | Hershenov | 333—1.1 |

JOHN K. CORBIN, Primary Examiner

U.S. Cl. X.R.

250—199; 333—10, 76, 83; 350—160